Nov. 9, 1954     E. H. PHREANER     2,693,986
SHAFT PROTECTOR SLEEVE
Filed Jan. 8, 1949
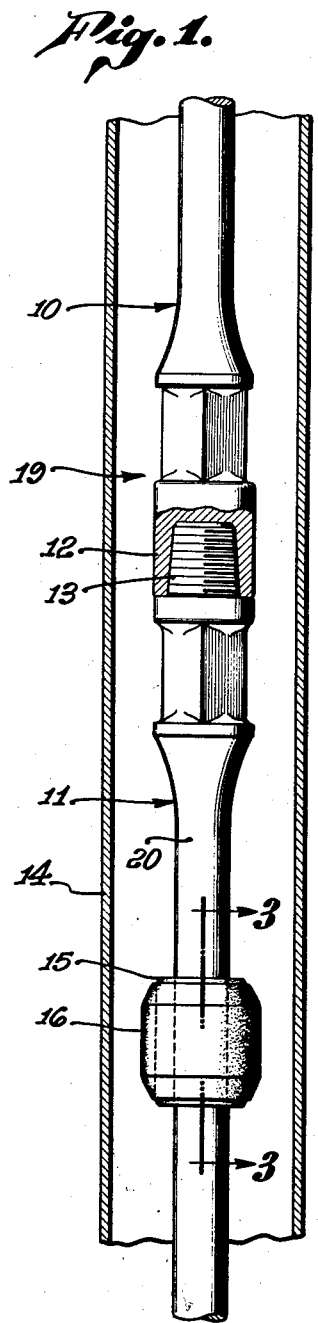
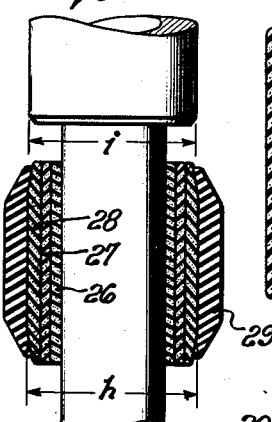
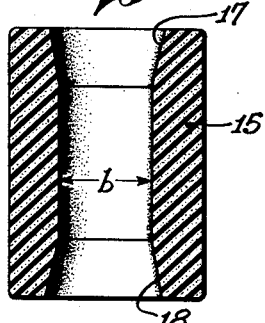
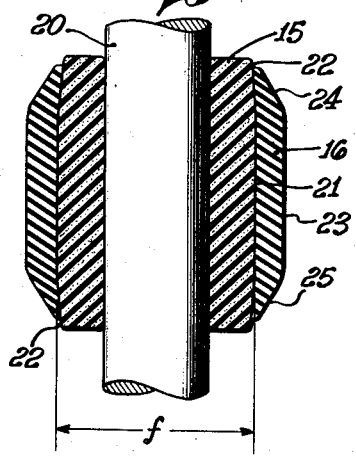
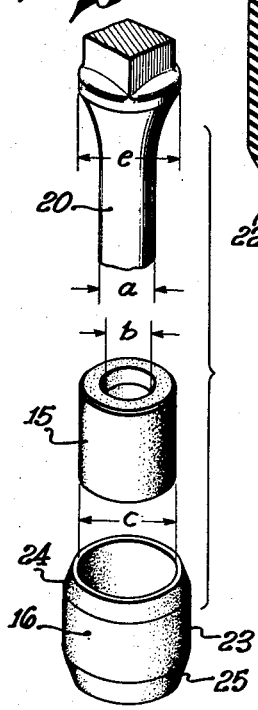
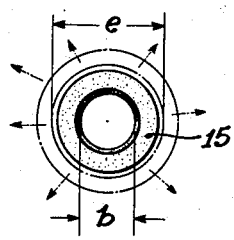
ELLIS H. PHREANER,
INVENTOR.
BY
ATTORNEY.

United States Patent Office 2,693,986
Patented Nov. 9, 1954

2,693,986

SHAFT PROTECTOR SLEEVE

Ellis H. Phreaner, Los Angeles, Calif., assignor of one-third to H. Calvin White, Pasadena, Calif.

Application January 8, 1949, Serial No. 69,873

6 Claims. (Cl. 308—4)

This invention relates generally to improved protectors for movable shafts and concerns particularly novel protectors applicable about such shafts to prevent their wearing engagement with surrounding tubing, casing, or the like.

In the drilling and operation of oil wells, as in certain other situations, it is often desirable to employ shafts relatively movable within an outer casing or tubing. Typical examples of such shafts used in the oil industry are drill pipes, tool strings, and the "sucker rods" employed in pumping oil from a producing well. To protect a shaft from wearing engagement with the surrounding tubing or casing, one or more annular rubber protector sleeves are customarily applied about the shaft at longitudinally spaced locations. However, the protectors heretofore employed have had certain disadvantages rendering them difficult to apply and relatively short lived. One of the greatest difficulties has resulted from the fact that movable shafts of the defined types are formed of a series of sections having their ends appreciably enlarged for threaded interconnection. Thus, any annular protector sleeve must be sufficiently expansible to be stretched over these enlarged ends for application to the shaft. Further, it must have sufficient resilience to return to normal condition for tightly gripping the shaft after being thus stretched. Such resilient rubber, however, has relatively poor abrasion resisting characteristics and thus does not have as long an effective life as would be desired. Further, in order to tightly grasp the shaft, the sleeve material must be under considerable internal stress at all times after application, and that stressed condition renders it even more susceptible to wear. An added disadvantage lies in the fact that, to afford even partially satisfactory wearing qualities, the sleeve must be thicker and of stiffer rubber than would be most desirable for application purposes, and thus a specially constructed mechanical device is usually necessary to sufficiently stretch the sleeve for application past the shaft enlargement.

The present invention overcomes the above difficulties by providing a novel protector particularly characterized by maximum wear resisting qualities combined with novel ease of application to a shaft. In accordance with the invention, I employ a tubular body of resilient material, such as rubber, applied about the shaft and having an outer portion of relatively stiff abrasion resisting material. Preferably, I provide a composite protector having a tubular inner section of relatively resilient rubber adapted to be easily stretched over an enlargement for application to a shaft, and a tubular outer section of relatively stiff abrasion resistant rubber applied about the inner section. Bonding material may secure these two sections against relative displacement. The outer section may have a normal internal diameter sufficiently greater than the external diameter of the main portion of the shaft that it will pass over the enlargement with very little if any stretching. It is because the outer section may thus be applied without appreciable stretching that this section may practically be composed of relatively stiff rubber capable of withstanding considerable abrasion. Further, the outer section is not under the excessive stresses of the conventional one-piece protector, and is thus, for a second reason, far less susceptible to wear. The outer surface of the outer section, may be tapered or streamlined at its ends to minimize any tendency for that section to be displaced from the inner section upon engagement with an irregularity on the casing wall.

A further object of the invention is to provide an inner protector section especially designed to present, after application to a shaft, a slightly tapered outer surface facilitating application of the outer section.

The above and further features and objects of the present invention will be better understood from the following detailed description of the typical embodiment illustrated in the acccompanying drawing, in which:

Fig. 1 is a side elevation, partly in section, of a composite protector embodying the invention and applied to an oil well "sucker rod";

Fig. 2 is an enlarged vertical section through the inner section of the protector before application to the rod;

Fig. 3 is an enlarged vertical section taken on line 3—3 of Fig. 1 showing both sections of the protector;

Fig. 4 is an exploded perspective of the sucker rod and both protector sections showing the sections in their normal conditions before application;

Fig. 5 is a plan view of the inner section, showing, in dot-dash lines, its outwardly expanded condition when passing over the sucker rod enlargement; and Fig. 6 is a sectional view of a variational form of protector embodying the invention.

The drawings illustrate a preferred form of composite protector applied typically to sucker rod 19, which includes a pair of sections 10 and 11 and is contained within the usual tubing 14. The sucker rod sections are conventional in form, section 10 having a lower internally threaded socket or box end 12, and section 11 having an upper externally threaded pin end 13 threadly received within socket 12. As in the great majority of such sectional shafts, each section is considerably enlarged at its ends, the maximum diameter of the enlarged ends being indicated at $e$ in Fig. 4.

The present composite protector comprises an inner tubular sleeve or section 15 of relatively resilient rubber, and an outer tubular section 16 of relatively stiff abrasion resistant rubber. Since section 15 does not engage the surrounding tubing at any time, it may be of considerably more resilient rubber than the customary one-piece protector sleeve which does directly engage the tubing. Thus, sleeve 15 may be easily stretched to the dot-dash condition of Fig. 5 in which its internal diameter is as great as the external diameter of the shaft enlargement, to permit its passage over the enlargement and onto the main reduced portion 20 of the rod. Also, because of the resiliency of section 15, such application may be accomplished without employing special apparatus, as is required with conventional protectors.

The normal internal diameter $b$ of inner section 15 is somewhat smaller than the external diameter $a$ of the main portion of the rod,. so that section 15 tightly engages the rod after being applied and is thus effectively retained against vertical displacement. The bore of section 15 is somewhat enlarged at either end, as at 17 and 18 in Fig. 2, causing outer surface 21 of section 15 to be tapered toward a slightly reduced diameter at its ends after application to the rod (see Fig. 3). Such tapered condition of surface 21 permits easy application of outer section 16 by presenting a reduced end onto which it may be slipped. The normal internal diameter $c$ of the outer section (see Fig. 4) is slightly smaller than the applied external diameter $f$ of the main portion of the inner section, in order to slightly compress the inner section when the outer section is slipped about it and thus retain section 16 against vertical displacement. The sections are so designed that diameters $c$ and $f$ of the adjacent surfaces are both approximately equal to diameter $e$ of the enlarged end of the rod. Thus, section 16 can be easily slipped past the enlargement with little, if any, expansion. This permits the use of an outer section of relatively stiff abrasion resistant rubber. A suitable bonding material or cement may be applied at 22 to the engaging surfaces of the inner and outer sections to more positively retain them in the illustrated positions.

The outer surface 23 of section 16 is tapered inwardly at its ends to present angularly disposed annular surfaces 24 and 25 which act to minimize the tendency for displacement of section 16 from section 15 upon engagement with irregularities on the inner wall of tubing 14.

The described composite protector is easily applied to the rod without the necessity for the usual mechanical applying device, by first stretching section 15 over one of the enlarged ends of the rod and then slipping section 16, without appreciable stretching, past the enlargement and onto section 15.

During the vertically reciprocating operation of sucker rod 19, the protector is engageable with the inner wall of tubing 14 to protect the shaft and tubing against direct contact. Upon such engagement with the tubing, outer section 16 of the protector is far less susceptible to wear than the conventional protector, due to its stiffer composition, its relatively unstressed internal condition, and to the cushioning effect of the very resilient inner section.

Fig. 6 shows a variational form of the invention especially adapted for use with relatively large diameter shafts, such as oil well drilling rods. In this arrangement, I form the protector of a plurality of inner relatively resilient tubular sections or layers 26, 27, and 28, the outer of which has an applied external diameter $h$ approximately equal to the external diameter $i$ of the shaft enlargement, and an outer tubular section 29 of relatively stiff abrasion resistant material. Such sectional formation of the inner resilient portion of the protector renders it easier to apply to a large diameter shaft than would be a single rather thick inner sleeve.

I claim:

1. A composite protector for a shaft having an enlarged diameter joint end and a smaller diameter beyond said end, comprising an inner tubular rubber section having a normal internal diameter less than said smaller diameter of the shaft and expansible and movable over said enlarged diameter end to applied condition on the smaller diameter surface of the shaft, and an outer exposed tubular sleeve of preformed, continuously circular, relatively stiff, elastomer-containing material movable endwise over said enlarged end of the rod and onto the outer surface of the inner section, the inside of said outer sleeve having full circular engageability with and being bondable to the outer adjacent surface of said inner section so that the two sections may form an integrated composite; and the external diameter of said inner section therefore being at least as great as the bore diameter of said outer sleeve.

2. A protector as defined in claim 1, in which the outer sleeve is preformed to have an internal diameter less than the external diameter of the surface of the inner section to which the sleeve is applied.

3. A protector as defined in claim 1, in which said inner section has in its said applied condition an external diameter as great as the diameter of said enlarged end of the shaft.

4. A protector as defined in claim 1, in which said inner section has in its said applied condition an external diameter as great as the diameter of said enlarged end of the shaft, and said outer sleeve is of stiff formation capable without deformation of passing over said end of the shaft.

5. A protector as defined in claim 1, in which the diameter of the bondable adjacent surfaces of the inner section and sleeve are approximately equal to the diameter of the enlarged joint end of the rod.

6. A protector as defined in claim 1, in which the inner section in its said applied condition has a longitudinally tapered surface onto which the outer sleeve is movable and to which the outer sleeve is bondable.

References Cited in the file of this patent

UNITED STATES PATENTS

| Number | Name | Date |
| --- | --- | --- |
| 2,045,629 | Bettis | June 30, 1936 |
| 2,093,092 | McElhany | Sept. 14, 1937 |
| 2,143,106 | Freedlander | Jan. 10, 1939 |
| 2,205,910 | Raybould | June 25, 1940 |
| 2,295,873 | Stone | Sept. 15, 1942 |
| 2,299,978 | Hall | Oct. 27, 1942 |
| 2,308,147 | Ballagh | Jan. 12, 1943 |
| 2,368,415 | Grant | Jan. 30, 1945 |
| 2,378,738 | Smith et al. | June 19, 1945 |
| 2,457,647 | Dodge | Dec. 28, 1948 |
| 2,468,985 | Krotz | May 3, 1949 |
| 2,604,365 | Howard | July 22, 1952 |